DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 790

T908,011

POLYISOCYANATE MODIFIED THERMOPLASTIC POLYESTER COMPOSITIONS

William Kenneth Witsiepe, Wilmington, Del., assignor to E. I. du Pont de Nemours and Company, Wilmington, Del.

Filed Dec. 17, 1971, Ser. No. 209,424
Int. Cl. C08g *22/10, 22/48*
U.S. Cl. 260—75 NK
No Drawing. 28 Pages Specification

A modified polyester composition prepared by mixing a segmented copolyester polymer with about 2–50 milliequivalents per 100 g. of copolyester polymer of a polyisocyanate and subsequently contacting the resulting mixture with water, preferably by exposure to atmospheric water vapor. The initial copolyester has an inherent viscosity of at least about 0.75 at 30° C. in m-cresol and consists essentially of 5–80% by weight of ester units of the structure $$-OGO-\overset{O}{\overset{\|}{C}}-R-\overset{O}{\overset{\|}{C}}-$$

and 20–95% by weight of ester units of the structure $$-ODO-\overset{O}{\overset{\|}{C}}-R-\overset{O}{\overset{\|}{C}}-$$

G being a divalent radical remaining after the removal of terminal hydroxyl groups from a long chain glycol having a melting point below about 65° C. and a molecular weight of 600–6000, R is a divalent radical remaining after removal of carboxyl groups from a dicarboxylic acid having a molecular weight of less than about 300, and D is a divalent radical remaining after removal of hydroxyl groups from a diol having a molecular weight of less than about 250. Useful polyisocyanates range from monomeric polyisocyanates such as toluene diisocyanate to isocyanato-terminated reaction products having an isocyanato group assay as low as 0.2%.

The modified polyester compositions are thermoplastic and exhibit tensile strength, permanent set, compression set, and flex resistance. They may be processed by procedures used for thermoplastics in general.